Aug. 25, 1931.            P. H. MANNING            1,820,359
COMBINED CLUTCH RELEASE AND BRAKE SETTING DEVICE
Filed Nov. 12, 1928
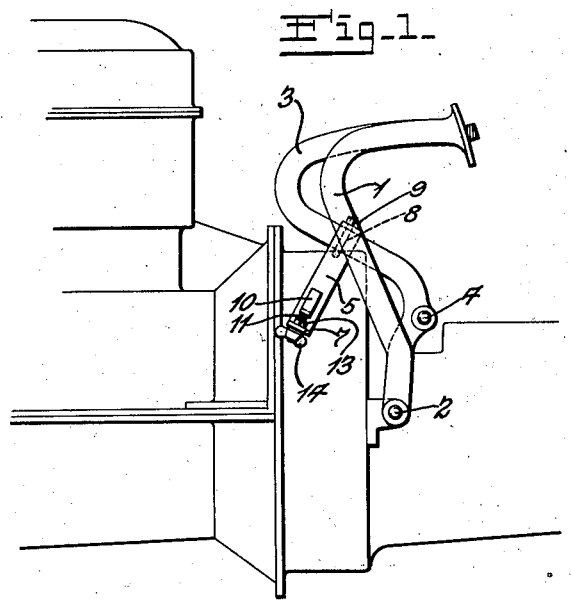
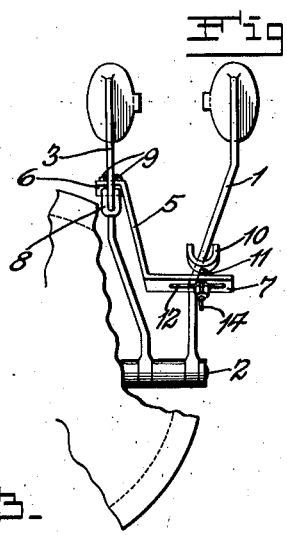
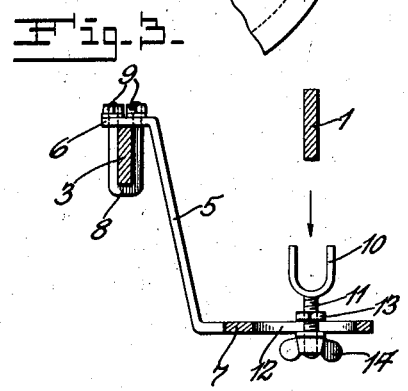
Inventor:
Prentice H. Manning,
by Rippey & Kingsland.
His Attorneys.

Patented Aug. 25, 1931

1,820,359

UNITED STATES PATENT OFFICE

PRENTICE H. MANNING, OF BOWLING GREEN, MISSOURI

COMBINED CLUTCH RELEASE AND BRAKE SETTING DEVICE

Application filed November 12, 1928. Serial No. 318,787.

This invention relates to a combined clutch release and brake setting device and has special reference to a device for attachment to one of the pedal arms so that automatically and as an incident to the operation of the clutch release pedal the service brake pedal and connections will be operated to set the brakes of a motor vehicle.

An object of the invention is to provide a device designed and adapted for use as an accessory so that it may be attached to one of the pedal arms of a standard automobile and which is so combined and cooperatively related to the pedal arms that automatically and as an incident to the operation of the clutch release pedal the service brake pedal will be operated to set the brakes; and which is so arranged and combined with said pedals that the service brake pedal may be operated without operating the clutch release pedal.

Another object of the invention is to provide a device of the type and character mentioned which is capable of application to a wide variety of clutch release pedals and brake pedals so that the device may be manufactured of a standard form and applied to clutch pedals and brake pedals on cars of different types wherein the clutch pedals and brake pedals are of different form and arrangement.

Other objects will appear from the following description, reference being made to the drawings in which Fig. 1 is a side elevation of the invention applied for cooperation with clutch pedals and brake pedals of familiar form.

Fig. 2 is a front elevation.

Fig. 3 is a sectional view showing the arrangement of the pedals and their relationship to the device of the present invention.

The clutch release pedal and brake pedal in connection with which I have shown the invention include a familiar clutch release pedal 1 pivotally mounted upon a support 2, and a service brake pedal 3 also pivotally mounted and provided with means 4 for connection with the usual brake rods or other brake operating connections (not shown).

It is a familiar fact that these pedals 1 and 3 are independently operative. When the clutch release pedal 1 is operated to release the clutch on an incline or hillside, for instance, to prevent the car from rolling forwardly or backwardly, as the case may be, it is necessary to operate either the service brake pedal or to set the emergency brake. To operate the service brake pedal it has heretofore been necessary to do so by use of the foot that controls the accelerator. To set the emergency brake it has heretofore been necessary to remove one hand from the steering wheel. It is equally undesirable under such circumstances to remove the foot from the accelerator to operate the service brake pedal or to remove one hand from the steering wheel to set and release the emergency brake lever. It is more desirable under such conditions to operate the service brake pedal automatically and as an incident to the complete release of the clutch, and the present invention comprises a device for so doing.

The device of the present invention is designed and adapted for connection with the service brake pedal and for adjustment thereon in a relationship to the clutch release pedal so that during the final movements of the clutch release pedal toward position to release the clutch, but not during any other portion of the movement of the clutch release pedal, the service brake pedal will be operated automatically and incidentally to such operation of the clutch release pedal. The present invention also comprises a construction in which the parts thereof may be adjusted and rearranged as required for different shapes of pedals. As shown, said device comprises a bar including an intermediate portion 5, an angular extension 6 at one end and an angular extension 7 projecting from the opposite end of said intermediate portion. The angular extension 6 is designed, adapted and arranged to extend across the service brake pedal 3 and to be attached thereto by any appropriate fastener, such as the bifurcated element or clevis 8, which is constructed so as to receive the service brake pedal 3 between the arms thereof and which is of sufficient length so that its threaded ends may project through the extension 6 of the bar. Nuts 9 are screwed upon the threaded ends of this fastener or clevis 8 so as to clamp the device firmly upon and in connection with the service brake pedal. The nuts 9 are operative on the threaded ends of the fastener or clevis 8 so that said nuts may be released and tightened to permit removal or readjustment of the device.

The combined length of the parts 5, 6 and 7 forming the bar is greater than the distance between the pedals 1 and 3 so that when the end 6 is attached to the pedal 3 the end 7 extends across the plane in which the pedal 1 operates, as will be readily understood by reference to Figs. 2 and 3. It is familiar that the clutch release pedal 1 is moved forwardly, that is, toward the left, as seen in Fig. 1, in order to release the clutch; and that the pedal 3 is moved forwardly in order to set the brakes.

I provide means for utilizing the final forward movement of the pedal 1 to operate this bar 5—6—7 and thereby operate the service brake pedal 3 sufficiently to set the brakes. For this purpose I provide an abutment 10 in connection with the extension 7 for engagement by the pedal 1 during the final portion of the forward movement of said pedal 1 to release the clutch. The abutment 10 is preferably, though not essentially, a fork having a threaded stem 11 projecting through a slot 12 in the bar extension 7 so that said abutment may be readily adjusted along a poriton of the longitudinal extent of said extension 7 sufficiently to conform to the relative positions of the clutch and brake pedals. Moreover, this abutment is also capable of adjustment in a direction toward and away from the clutch release pedal so that abutting contact of the clutch release pedal therewith may be obtained at different points in the forward movement of the clutch release pedal. That is to say, by one adjustment of the abutment 10 the clutch release pedal may be made to contact with this abutment after the clutch release pedal has moved a given extent from its starting position or has moved more or less than such given extent.

For effecting this variation in the position of the abutment 10 I provide a nut 13 which is screwed on the stem 11 and which is between the bar extension 7 and said abutment 10; and a nut 14 which is screwed on the end of the stem 11 and cooperates with the nut 13 to clamp the extension 7 between them and thus rigidly support the abutment 10 in whatever adjustment it may be placed. Thus, it will be seen that, by adjusting the abutment along the extension 7, the device may be accommodated to variations in the spacing of the clutch release pedal from the service brake pedal; and, by adjusting the abutment by use of the clamp devices 13—14, the time of operation of the service brake pedal by the clutch release pedal may be varied. Moreover, the device is adjustable along the brake release pedal.

From the foregoing it must be plain that my invention obtains all of its intended objects and purposes in a highly efficient and satisfactory manner. The device may be manufactured of standard form and dimensions and is capable of application in connection with service brake pedals and clutch release pedals having different relationships to each other. The device, therefore, becomes a standard accessory for automobiles of different types and may be added to such automobiles while they are in service and without the necessity of being built in the automobiles at the factory.

I claim:

1. In a motor vehicle, the combination with a clutch release pedal movable from a starting position to release a clutch, and a service brake pedal movable from a starting position to set the brakes and in the same general direction as the movement of the clutch release pedal as aforesaid, of an abutment for the clutch release pedal, means for supporting said abutment in connection with the service brake pedal in a position in which the clutch release pedal will engage said abutment during its final movements from said starting position and will move said abutment in a direction and to an extent sufficient to operate said service brake pedal in a direction and to an extent to set the brakes, and means for securing said abutment on said supporting means in a position to cooperate with said clutch release pedal irrespective of the position in which said supporting means is mounted upon said service brake pedal.

2. A device for operating a service brake connection by the clutch release pedal of an automobile comprising an angular bar, means for supporting said angular bar in connection with said service brake devices in position in which said angular bar extends across the plane of movement of the clutch release pedal, an abutment for the clutch release pedal mounted on said bar, and means for securing said abutment in connection with said bar in different positions along said bar and at different distances from the starting position of said clutch release pedal.

3. In a motor vehicle, a device for operating a service brake connection by the usual clutch release pedal comprising an angular bar, means for supporting said angular bar in connection with said service brake operating connection in position in which said angular bar extends laterally across the plane of movement of said clutch release pedal, an abutment, and means for supporting said abutment in different adjusted positions along said bar at different distances from said brake operating connection according to the distance of said clutch release pedal laterally from said brake operating connection.

PRENTICE H. MANNING.